(12) United States Patent
Agerton et al.

(10) Patent No.: US 11,667,069 B2
(45) Date of Patent: *Jun. 6, 2023

(54) BLOW MOLDED ARTICLE WITH VISUAL EFFECTS

(71) Applicant: The Procter & Gamble Company, Cincinnati, OH (US)

(72) Inventors: Mark Lewis Agerton, Mason, OH (US); Marc Andrew Mamak, Mason, OH (US); Amanda Susan Ehrhardt, Cincinnati, OH (US); Bradley Scott Neufarth, Loveland, OH (US); Andrew Joseph Horton, Middletown, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 343 days.

This patent is subject to a terminal disclaimer.

(21) Appl. No.: 16/845,283

(22) Filed: Apr. 10, 2020

(65) Prior Publication Data

US 2020/0324455 A1 Oct. 15, 2020

Related U.S. Application Data

(60) Provisional application No. 62/832,838, filed on Apr. 11, 2019.

(51) Int. Cl.
*B29C 49/22* (2006.01)
*B29C 49/00* (2006.01)
*B29L 31/00* (2006.01)

(52) U.S. Cl.
CPC .......... *B29C 49/22* (2013.01); *B29C 49/0005* (2013.01); *B29C 2949/072* (2022.05);
(Continued)

(58) Field of Classification Search
CPC ... B29B 11/08; B65D 1/0207; B29C 49/0005; B29C 2949/3016; B29C 2949/072; B29C 2949/0867; B29C 2949/3008; B29C 2949/0819; B29C 49/06; B29C 2949/30; B29C 2949/3026; B29C 2949/26;
(Continued)

(56) References Cited

U.S. PATENT DOCUMENTS 1,554,191 A 9/1925 Alexander
3,222,439 A 12/1965 Bolomey et al.
(Continued)

FOREIGN PATENT DOCUMENTS

CN 1538995 A 10/2004
CN 1673284 A 9/2005
(Continued)

OTHER PUBLICATIONS

All final and non-final office actions for U.S. Appl. No. 16/158,841 (P&G Case CM4872M).
(Continued)

*Primary Examiner* — Monica A Huson
(74) *Attorney, Agent, or Firm* — Jay A. Krebs

(57) ABSTRACT

A blow molded monolayer article. The article has a hollow body defined by a wall. The wall has one or more regions comprising a first composition and one or more regions formed by a second composition.

20 Claims, 6 Drawing Sheets
(2 of 6 Drawing Sheet(s) Filed in Color)

(52) U.S. Cl.
CPC ............ *B29C 2949/0819* (2022.05); *B29C 2949/0867* (2022.05); *B29C 2949/20* (2022.05); *B29C 2949/30* (2022.05); *B29C 2949/3026* (2022.05); *B29K 2867/003* (2013.01); *B29K 2995/0018* (2013.01); *B29L 2031/7158* (2013.01)

(58) Field of Classification Search
CPC ............ B29C 2949/24; B29C 2949/20; B29C 2949/3012; B29C 2949/22; B29K 2023/065; B29K 2105/0032; B29K 2995/0018; B29K 2995/0026; B29K 2867/003; B29K 2067/003; B29K 2105/26; B29K 2995/0021; B29K 2227/06; B29K 2995/0025; B29K 2023/12; B29L 2031/7158
See application file for complete search history.

(56) References Cited

U.S. PATENT DOCUMENTS

| | | |
|---|---|---|
| 3,420,924 A | 1/1969 | Mason et al. |
| 3,550,197 A | 12/1970 | Szajna et al. |
| 4,421,560 A | 12/1983 | Kito et al. |
| 4,457,961 A | 7/1984 | Nakazawa |
| 4,535,901 A | 8/1985 | Okudaira |
| 4,728,549 A | 3/1988 | Shimizu et al. |
| 4,868,026 A | 9/1989 | Shimizu |
| 4,919,983 A | 4/1990 | Fremin |
| 4,957,949 A | 9/1990 | Kamada et al. |
| 4,994,313 A | 2/1991 | Shimizu |
| 5,431,697 A | 7/1995 | Kamata et al. |
| 5,595,799 A | 1/1997 | Beck et al. |
| 5,628,950 A | 5/1997 | Schrenk et al. |
| 5,628,957 A | 5/1997 | Collette et al. |
| 5,712,009 A | 1/1998 | Moore et al. |
| 5,849,224 A | 12/1998 | Valyi |
| 5,927,525 A | 7/1999 | Darr et al. |
| 6,123,211 A | 9/2000 | Rashid et al. |
| 6,129,960 A | 10/2000 | Kudert et al. |
| 6,294,602 B1 | 9/2001 | Shimo et al. |
| 6,296,911 B1 | 10/2001 | Catarineu |
| 6,405,867 B1 | 6/2002 | Moore |
| 6,562,276 B1 | 5/2003 | Shelby et al. |
| 6,596,213 B2 | 7/2003 | Swenson |
| 6,663,822 B1 | 12/2003 | Cargill |
| 6,737,132 B1 | 5/2004 | Michihata et al. |
| 6,815,080 B2 | 11/2004 | Omori |
| 6,878,774 B2 | 4/2005 | Kikuchi et al. |
| 6,911,266 B1 | 6/2005 | Skov |
| 6,929,136 B2 | 8/2005 | Salazar-leal |
| 6,929,836 B2 | 8/2005 | Kikuchi |
| 7,534,829 B2 | 5/2009 | Tai et al. |
| 7,662,466 B2 | 2/2010 | Seeboth et al. |
| 7,828,890 B2 | 11/2010 | Henglein |
| 7,906,054 B2 | 3/2011 | Hirschfelder et al. |
| 8,097,317 B2 | 1/2012 | Katou |
| 8,124,234 B2 | 2/2012 | Weaver et al. |
| 8,485,935 B2 | 7/2013 | Hecht |
| 8,535,595 B2 | 9/2013 | Meiki et al. |
| 8,580,365 B2 | 11/2013 | Abe |
| 8,734,923 B2 | 5/2014 | Shi |
| 8,883,920 B2 | 11/2014 | Inoue et al. |
| 8,895,120 B2 | 11/2014 | Dierickx |
| 8,968,147 B2 | 3/2015 | Hecht |
| 9,000,068 B2 | 4/2015 | Trummer |
| 9,114,895 B2 | 8/2015 | Sato et al. |
| 9,162,429 B2 | 10/2015 | Suga et al. |
| 9,597,825 B2 | 3/2017 | Schmidt et al. |
| 9,708,092 B2 | 7/2017 | Bowen et al. |
| 9,731,482 B2 | 8/2017 | Arakawa et al. |
| 9,862,157 B2 | 1/2018 | Hosokoshiyama |
| 10,279,948 B2 | 5/2019 | Yang et al. |
| 10,518,922 B2 | 12/2019 | Yang et al. |
| 11,046,473 B2 * | 6/2021 | Agerton ............ B32B 27/304 |
| 2002/0009565 A1 | 1/2002 | Fehn |
| 2004/0146675 A1 | 7/2004 | Hashimoto et al. |
| 2004/0194663 A1 | 10/2004 | Li |
| 2005/0142309 A1 | 6/2005 | Goto et al. |
| 2005/0170113 A1 | 8/2005 | Hill |
| 2005/0170114 A1 | 8/2005 | Hill |
| 2005/0287323 A1 | 12/2005 | Akiyama et al. |
| 2006/0029823 A1 | 2/2006 | Brown |
| 2008/0017076 A1 | 1/2008 | Noguchi |
| 2008/0193787 A1 | 8/2008 | Dierickx |
| 2008/0241447 A1 | 10/2008 | Shi |
| 2008/0317989 A1 | 12/2008 | Abe et al. |
| 2009/0233026 A1 | 9/2009 | Akiyama |
| 2010/0028577 A1 | 2/2010 | Siegl |
| 2010/0206784 A1 | 8/2010 | Weaver et al. |
| 2010/0307633 A1 | 12/2010 | Dierickx |
| 2011/0100857 A1 | 5/2011 | Wang et al. |
| 2012/0171401 A1 | 7/2012 | Katou |
| 2012/0256356 A1 | 10/2012 | Akiyama |
| 2013/0069268 A1 | 3/2013 | Liu et al. |
| 2013/0273287 A1 | 10/2013 | Luo et al. |
| 2013/0313217 A1 | 11/2013 | Yamamoto et al. |
| 2014/0044904 A1 | 2/2014 | De Belder |
| 2014/0054255 A1 | 2/2014 | Hosokoshiyama et al. |
| 2014/0119813 A1 | 5/2014 | Moselage, III |
| 2015/0079320 A1 | 3/2015 | Katou |
| 2016/0017092 A1 | 1/2016 | Iwamoto et al. |
| 2017/0021552 A1 | 1/2017 | Dygert |
| 2017/0197351 A1 | 7/2017 | Chiba |
| 2017/0204251 A1 | 7/2017 | Agerton et al. |
| 2017/0259486 A1 | 9/2017 | Koerner |
| 2018/0002071 A1 | 1/2018 | Hosokoshiyama et al. |
| 2019/0009483 A1 | 1/2019 | Meadows et al. |
| 2019/0105805 A1 | 4/2019 | Dubuque |
| 2019/0112091 A1 | 4/2019 | Neufarth et al. |
| 2020/0024021 A1 | 1/2020 | Agerton |
| 2020/0122873 A1 | 4/2020 | Agerton |
| 2020/0171727 A1 | 6/2020 | Witz |
| 2020/0324456 A1 | 10/2020 | Mamak |
| 2020/0399463 A1 | 12/2020 | Wieloch et al. |
| 2021/0206141 A1 | 7/2021 | Neufarth et al. |
| 2021/0221551 A1 | 7/2021 | Neufarth et al. |
| 2021/0269188 A1 | 9/2021 | Agerton et al. |
| 2021/0316493 A1 | 10/2021 | Mamak et al. |

FOREIGN PATENT DOCUMENTS

| | | |
|---|---|---|
| CN | 1988995 A | 6/2007 |
| CN | 201484752 U | 5/2010 |
| CN | 102026793 A | 4/2011 |
| CN | 102498045 A | 6/2012 |
| CN | 102575076 A | 7/2012 |
| CN | 106573447 A | 4/2017 |
| CN | 107548352 A | 1/2018 |
| CN | 211732096 U | 10/2020 |
| DE | 202004018510 U1 | 9/2005 |
| DE | 102005022633 A1 | 11/2006 |
| DE | 102013011403 A1 | 1/2015 |
| EP | 0328014 A2 | 8/1989 |
| EP | 0354255 A1 | 2/1990 |
| EP | 2231373 B1 | 7/2015 |
| GB | 201203964 | 4/2012 |
| JP | S5381569 A | 7/1978 |
| JP | S57128520 A | 8/1982 |
| JP | S6294541 A | 5/1987 |
| JP | H05042641 A | 2/1993 |
| JP | 06171638 A | 6/1994 |
| JP | H06255052 A | 9/1994 |
| JP | H07186190 A | 7/1995 |
| JP | H07205195 A | 8/1995 |
| JP | H08156202 A | 6/1996 |
| JP | 2970292 B2 | 11/1999 |
| JP | 3134376 B2 | 2/2001 |
| JP | 2002104362 A | 4/2002 |
| JP | 2004203906 A | 7/2004 |
| JP | 2005219760 A | 8/2005 |
| JP | 2005308567 A | 11/2005 |
| JP | 2006168250 A | 6/2006 |

(56) References Cited

FOREIGN PATENT DOCUMENTS

| | | | |
|---|---|---|---|
| JP | 2006306470 A | 11/2006 | |
| JP | 2006312485 A | 11/2006 | |
| JP | 2007223628 A | 6/2007 | |
| JP | 2007186190 A | 7/2007 | |
| JP | 2007205195 A | 8/2007 | |
| JP | 2008156202 A | 7/2008 | |
| JP | 2008189314 A | 8/2008 | |
| JP | 2008208288 A | 9/2008 | |
| JP | 2009062059 A | 3/2009 | |
| JP | 4674136 B2 | 1/2011 | |
| JP | 5029879 B2 | 9/2012 | |
| JP | 2013028137 A | 2/2013 | |
| JP | 2015131438 A | 7/2015 | |
| JP | 2015131492 A | 7/2015 | |
| JP | 3207320 U | 10/2016 | |
| JP | 2017036069 A | 2/2017 | |
| JP | 2017128659 A | 7/2017 | |
| JP | 2018039536 A | 3/2018 | |
| JP | 2018058604 A | 4/2018 | |
| JP | 6593187 B2 | 10/2019 | |
| KR | 20010047311 A | 6/2001 | |
| TW | 201704107 A | 2/2017 | |
| TW | 201704108 A | 2/2017 | |
| TW | 201706189 A | 2/2017 | |
| WO | 2006127569 A2 | 11/2006 | |
| WO | 2007065508 A2 | 6/2007 | |
| WO | WO2007066508 A1 | 6/2007 | |
| WO | 2007098837 A1 | 9/2007 | |
| WO | WO2016031150 A1 | 3/2016 | |
| WO | 2017134099 A1 | 8/2017 | |
| WO | 2019133713 A1 | 7/2019 | |
| WO | 2020081114 A1 | 4/2020 | |

OTHER PUBLICATIONS

All final and non-final office actions for U.S. Appl. No. 16/158,719 (P&G Case 15306M).
All final and non-final office actions for U.S. Appl. No. 16/381,125 (P&G Case 15379M).
All final and non-final office actions for U.S. Appl. No. 16/845,295 (P&G Case 15512M).
C-Mold Co-Injection, Chapter 20, Copyright 1996 Advanced CAE Technology, Inc.
European Search Report for 17196087.5 dated Mar. 29, 2018.
PCT International Search Report and Written Opinion for PCT/US2018/053683 dated Feb. 15, 2019.
PCT International Search Report and Written Opinion for PCT/US2019/026939 dated Jul. 15, 2019.
PCT International Search Report and Written Opinion for PCT/US2019/040221 dated Aug. 30, 2019.
The Preferential Heating process for PET flat or asymmetric containers on SBO Universal and SBO Compact blow molders, www.sidel.com, publication date unknown.
15511M PCT Search Report and Written Opinion for PCT/US2020/027614 dated Sep. 14, 2020.
PCT Invitation to Pay Additional Fees, and, Where Applicable, Protest Fee, for PCT/US2020/027614 dated Jul. 24, 2020.
All Office Actions, U.S. Appl. No. 17/217,751.
All Office Actions; U.S. Appl. No. 17/144,281, filed Jan. 8, 2021.
All Office Actions; U.S. Appl. No. 17/226,203, filed Apr. 9, 2021.
All Office Actions; U.S. Appl. No. 17/320,569, filed May 14, 2021.

\* cited by examiner

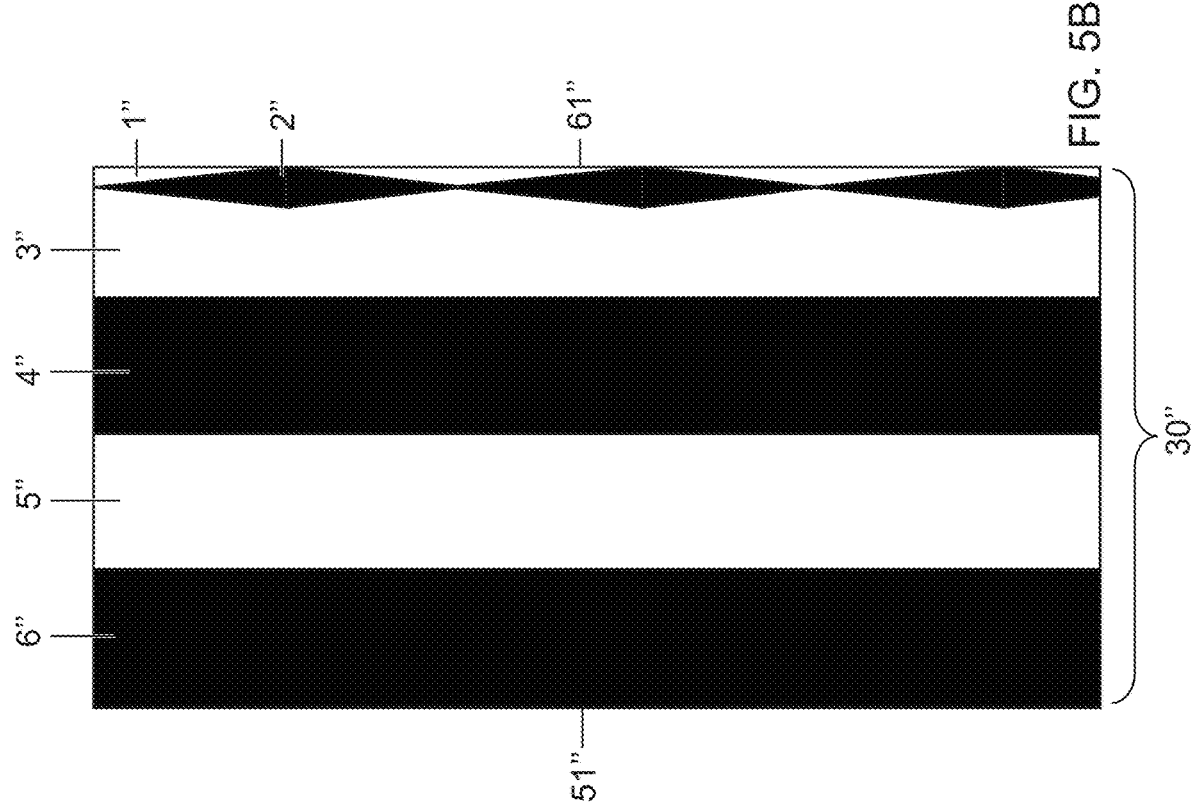
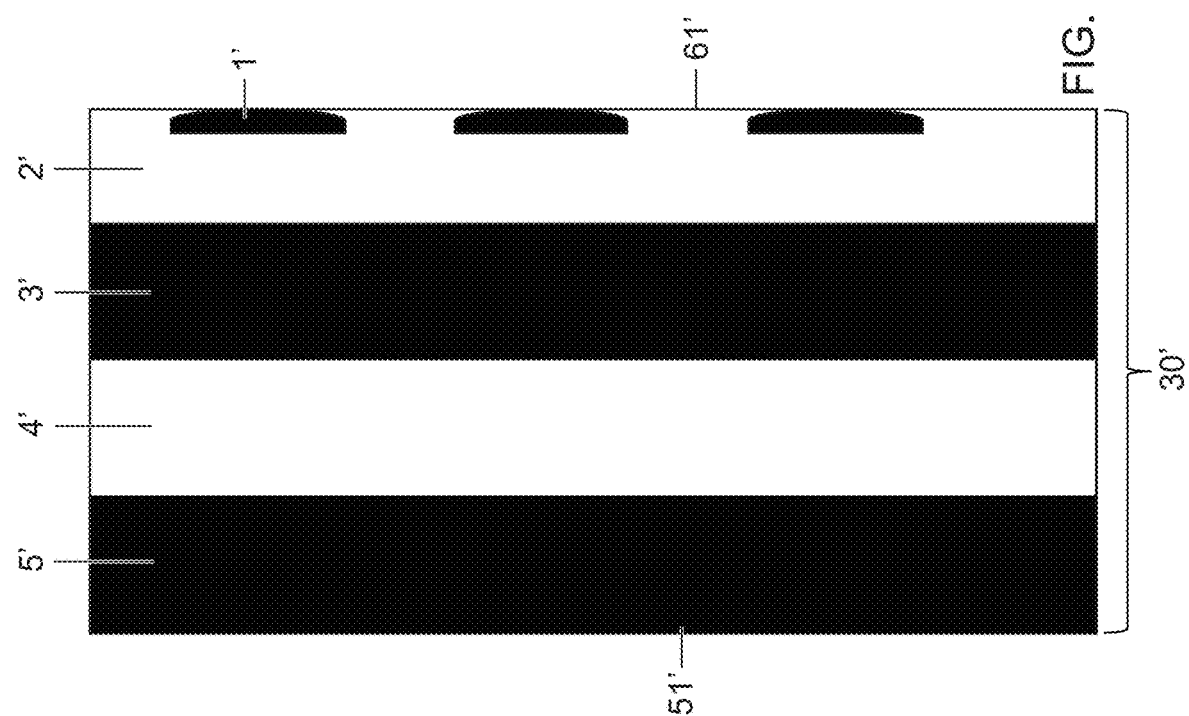

BLOW MOLDED ARTICLE WITH VISUAL EFFECTS

FIELD OF THE INVENTION

The present invention relates to blow molded articles with nonuniform visual effects including but not limited to ribbons, waves, or striations. The invention relates also to preforms for making such articles and to methods for making these preforms and articles.

BACKGROUND OF THE INVENTION

Consumers want to purchase articles, particularly hair and beauty products in blow molded containers, that grab their attention by having a unique and/or premium appearance at the store shelf and/or webpage/app.

To make eye-catching articles that connote luxury and quality, it can be desirable for the article to have a unique, irregular pattern.

One way to create unique patterns is to apply (e.g. by painting or printing) the pattern onto the blow molded article. However, this process adds complexity and cost to the article manufacturing and is generally not sustainable in the mass production of blow molded articles. Also, containers made with this method are generally less durable, since the paint/print can scratch off during filling, transit, and use.

Unique patterns can be achieved through extrusion blow molding (EBM). EMB is generally used with polypropylene (PP) and high-density polyethylene (HDPE) and cannot be used with polyethylene terephthalate (PET). Articles formed via EMB are generally weaker and hazy.

As such, there remains a need for a blow molded PET bottle with an irregular pattern and preforms and processes for making such articles.

SUMMARY OF THE INVENTION

A blow molded monolayer article comprising: (a) a hollow body defined by a wall comprising an inner surface and an outer surface, the wall being formed by one layer comprising: (i) one or more first regions comprising a first composition wherein the first region extends from the inner surface to the outer surface; (ii) one or more second regions comprising a second composition wherein the second region extends from the inner surface to the outer surface and wherein the second region comprises an axial color gradient; wherein the one or more first regions and the one or more second regions form an irregular pattern on the surface of the article.

BRIEF DESCRIPTION OF THE DRAWINGS

The patent or application file contains at least one photograph executed in color. Copies of this patent or patent application publication with color photograph(s) will be provided by the Office upon request and payment of the necessary fee.

While the specification concludes with claims particularly pointing out and distinctly claiming the subject matter of the present invention, it is believed that the invention can be more readily understood from the following description taken in connection with the accompanying drawings, in which:

FIG. 5A shows a schematic of a cross-section of an enlarged portion of a preform;

FIG. 5B shows a schematic of a cross-section of an enlarged portion of a preform.

DETAILED DESCRIPTION OF THE INVENTION

Figure 1:
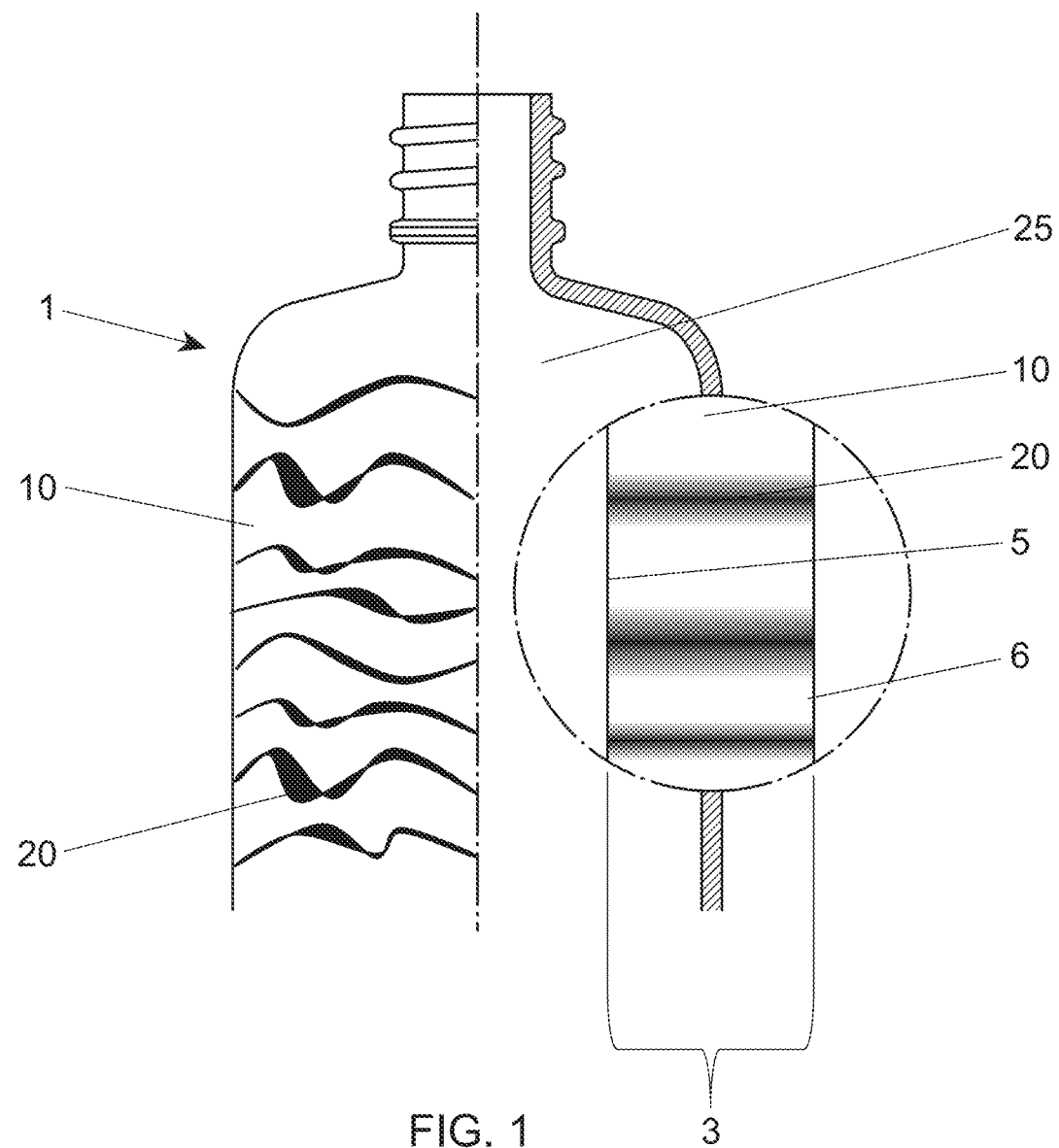
FIG. 1 represents schematically a monolayer bottle showing an enlarged schematic cross-section thereof.

While the specification concludes with claims particularly pointing out and distinctly claiming the invention, it is believed that the present disclosure will be better understood from the following description.

As used herein, "article" refers to an individual blow molded hollow object for consumer usage, e.g. a container suitable for containing compositions. Non-limiting examples can include a bottle, a jar, a cup, a cap, a vial, a tottle, and the like. The article can be used in storage, packaging, transport/shipping, and/or for dispensing compositions container therein. Non-limiting volumes containable within the container are from about 10 mL to about 1000 mL, about 100 ml to about 900 mL, from about 200 mL to about 860 mL, from about 260 mL to about 760 mL, from about 280 mL to about 720 mL, from about 350 mL to about 500 mL. Alternatively, the container can have a volume up to 5 L or up to 20 L.

The compositions contained in the article may be any of a variety of compositions and including detergents (such as laundry or dishwashing detergents), fabric softeners and fragrance enhancers (such as Downy® Fresh Protect) food products including but not limited to liquid beverages and snacks, paper products (e.g., tissues, wipes), beauty care compositions (e.g., cosmetics, lotions, shampoos, conditioners, hair styling, deodorants and antiperspirants, and personal cleansing including washing, cleaning, cleansing, and/or exfoliating of the skin, including the face, hands, scalp, and body), oral care products (e.g., tooth paste, mouth wash, dental floss), medicines (antipyretics, analgesics, nasal decongestants, antihistamines, cough suppressants, supplements, anti-diarrheal, proton pump inhibitor and other heartburn remedies, anti-nausea, etc.) and the like. The compositions can include many forms, non-limiting examples of forms can include liquids, gels, powders, beads, solid bars, pacs (e.g. Tide PODS®), flakes, paste, tablets, capsules, ointments, filaments, fibers, and/or sheets (including paper sheets like toilet paper, facial tissues, and wipes).

The article can be a bottle for holding a product, for instance a liquid product like shampoo and/or conditioner and/or body wash.

As used herein, the term "blow molding" refers to a manufacturing process by which hollow plastic articles containing cavities, suitable to accommodate compositions are formed. Generally, there are three main types of blow molding: extrusion blow molding (EBM), injection blow molding (IBM) and molding injection stretch blow molding (ISBM).

As used herein, the term "color" includes any color, such as, e.g., white, black, red, orange, yellow, green, blue, violet, brown, and/or any other color, or declinations thereof.

As used herein, the term "color gradient" refers to a colored region having a first region and a second region, wherein the colored region includes any continuous function in L*a*b* color space. The gradient can be a continuous function of any or all of the L*, a* and/or b* values versus measurement location across or along the samples.

As used herein, "effect pigment" means one of two main classes of pigments" "metal effect pigments" and "special effect pigments." Metal effect pigments consist of only metallic particles. They create a metal-like luster by reflection of light at the surface of the metal platelets when having parallel alignment in their application system. The incident light ray is fully reflected at the surface of the metal platelet without any transmitted component. Special effect pigments include all other platelet-like effect pigments which cannot be classified as "metal effect pigments". These are typically based on a substrate which has platelet shaped crystals (or particles) such as mica, (natural or synthetic) borosilicate glass, alumina flakes, silica flakes. These platelet shaped particles are typically coated with oxides like titanium dioxide, iron oxide, silicon dioxide, or combinations thereof.

Effect pigments can have a particle size, in the longest dimension, from about 1 μm to about 200 μm, from about 2 μm to about 150 μm, from about 3 μm to about 100 μm, from about 4 μm to about 75 μm, and/or from about 5 μm to about 5 μm. The effect pigments can have a thickness less than 5 μm, less than 3 μm, less than 1 μm, less than 800 nm, less than 700 nm, and/or less than 600 nm. The effect pigments can have a thickness from about 25 nm to about 5 μm, from about 100 nm to about 900 nm, from about 150 nm to about 800 nm, from about 200 nm to about 700 nm, from about 250 nm to about 600 nm, and/or from about 300 nm to about 560 nm.

Effect pigments are marketed as such by suppliers including Merck® and BASF®.

As used herein, "preform" is a unit that has been subjected to preliminary, usually incomplete, shaping or molding, and is normally further processed to form an article. The preform is usually approximately "test-tube" shaped.

As used herein, "substantially free" means less than 3%, alternatively less than 2%, alternatively less than 1%, alternatively less than 0.5%, alternatively less than 0.25%, alternatively less than 0.1%, alternatively less than 0.05%, alternatively less than 0.01%, alternatively less than 0.001%, and/or alternatively free of. As used herein, "free of" means 0%.

As used herein, "transparent" means that layer has total luminous transmittance of 50% or more and reflected haze of less than 5 haze units. The total luminous transmittance is measured in accordance with ASTM D1003, the reflected haze is measured in accordance with ASTM E430.

As used herein, the terms "include," "includes," and "including," are meant to be non-limiting and are understood to mean "comprise," "comprises," and "comprising," respectively. All percentages, parts and ratios are based upon the total weight of the compositions of the present invention, unless otherwise specified. All such weights as they pertain to listed ingredients are based on the active level and, therefore, do not include carriers or by-products that may be included in commercially available materials.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Where amount ranges are given, these are to be understood as being the total amount of said ingredient in the composition, or where more than one species fall within the scope of the ingredient definition, the total amount of all ingredients fitting that definition, in the composition.

FIG. 1 shows hollow article 1, in this example the hollow article is a container, specifically a bottle. The hollow article 1 includes hollow body 25 defined by wall 3 having an inner surface 5 and an outer surface 6. In this example, the wall 3 is monolayer with visual effects created by alternating first regions 10 comprising a first composition and second regions 20 comprising a second composition. The second regions 10 can be in one location, multiple locations, or as in this example, in multiple locations along the body of the article. In a monolayer structure, the first region can extend from the outer surface to the inner surface and the second region can extend from the outer surface to the inner surface.

Figure 2:
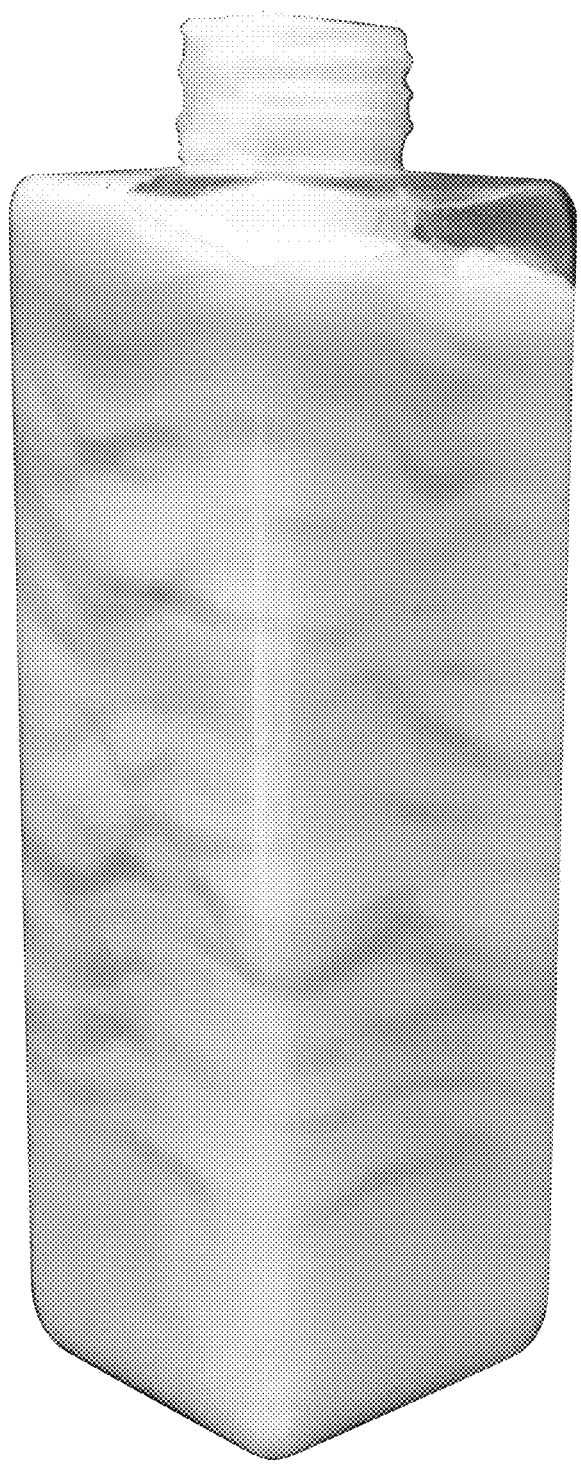
FIG. 2 is a photograph of a monolayer bottle with an irregular wavelike pattern.

The alternating first and second regions can be created during manufacturing the preform by using a pulsed flow when manufacturing the preforms. The pulsed flow is created by an abrupt, stepped or stuttered flow rate resulting in a pressure change during injection of the preform. This can cause the second region not to have a uniform color intensity, and the color can appear to taper at the top and/or bottom or bottom of the second region. When the preform is blow molded into a bottle, these color effects stretch and can resemble ribbons/waves, as seen in FIG. 2.

Between the first region and the second region the first composition and the second composition can be interpenetrated.

The first composition and the second composition can be the same thermoplastic resin, or they can be different thermoplastic resins. The first and second composition can have different pigments and/or dyes. In one example, the first composition can be substantially free of pigment and/or dye and the second composition can contain a pigment and/or dye, or vice versa. The outside surface can have variable gloss 20° and/or surface roughness in the first regions as compared to the second regions or the gloss and surface roughness can be substantially the same.

The articles can have a smooth surface that will give rise to a glossy effect. In the first regions and/or the second regions the outer surface can have a location with a gloss 20° of greater than or equal to 65 GUs, greater than or equal to 68 GUs, greater than or equal to 70 GUs, greater than or equal to 71 GUs, greater than or equal to 73 GUs, greater than or equal to 75 GUs, greater than or equal to 80 GUs, greater than or equal to 85 GUs, greater than or equal to 90 GUs, and/or greater than or equal to 100 GUs. The glossy region can have a location with a gloss 20° of from about 65 to about 150 GUs, from about 68 GUs to about 125 GUs, from about 69 to about 100 GUs, from about 70 GUs to about 95 GUs, and/or 75 GUs to about 89 GUs. The gloss 20° can be substantially the same across the bottle. The gloss 20° can vary by less than 20% across the bottle, less than 15%, less than 10%, and/or less than 5%.

The first regions and/or the second regions of the article the outer surface can have one or more areas with a low surface roughness of less than 8 μin (0.2032 μm), 5 μm (0.127 μm), less than 3 μin (0.0762 μm), and/or less than 2 μm (0.0508 μm). The glossy region can have a location with a surface roughness from about 0.5 μin (0.0127 μm) to about 4 μin (0.1016 μm), from about 0.75 μin (0.01905 μm) to about 3.5 μin (0.0889 μm), from about 1 μin (0.0254 μm) to about 3.25 μin (0.08255 μm), from about 1 μin (0.0254 μm) to about 3 μin (0.0762 μm), and/or from about 1.25 μin (0.03175 μm) to about 3 μin (0.0762 μm).

The first regions and/or the second regions of the article the outer surface can one or more areas with a higher surface roughness of greater than 25 μin (0.635 μm), greater than 28 μin (0.7112 μm), greater than 30 μin (0.762 μm), greater than 31 μin (0.7874 μm), and/or greater than 32 μin (0.8128 μm). The matte region can have a location with a surface roughness from about 20 μin (0.508 μm) to about 42 μin (1.0668 μm), from about 25 μin (0.635 μm) to about 40 μin (1.016 μm), from about 28 μin (0.7112 μm) to about 38 μin (0.9652 μm), and/or from about 30 μin (0.762 μm) to about 36 μin (0.9144 μm). In these examples, the article may have a higher, as compared to the lower surface roughness, but it still feels smooth to a person's touch. It may feel like the surface of a pearl or have a soft feel.

Figure 3:
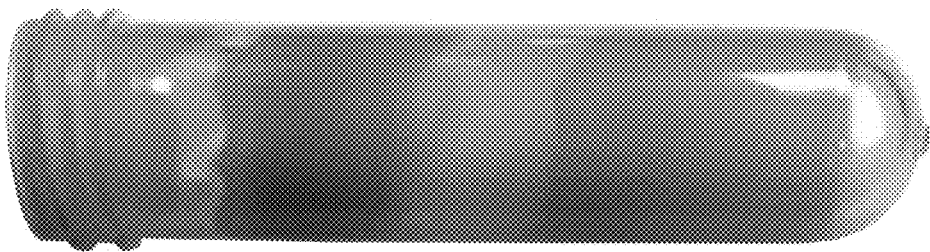
FIG. 3 is a photograph of preforms with an irregular pattern.
Figure 3:
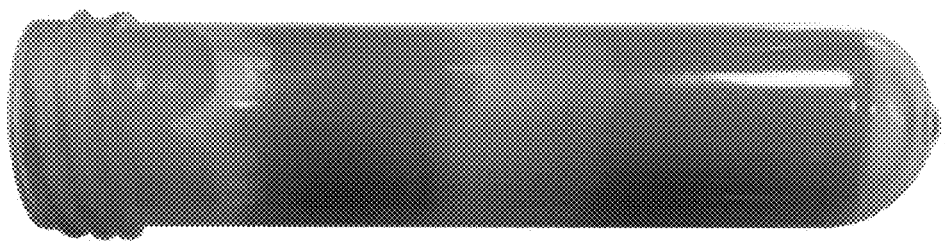
Figure 3:
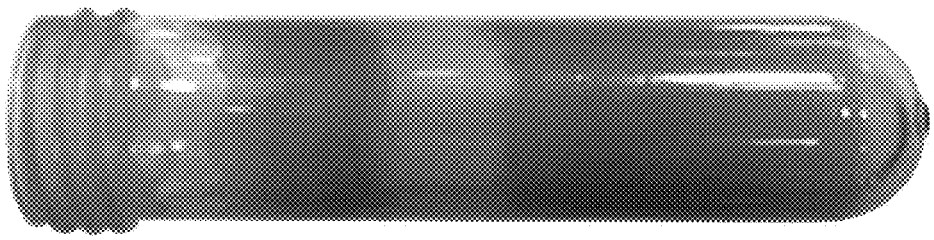
Figure 3:
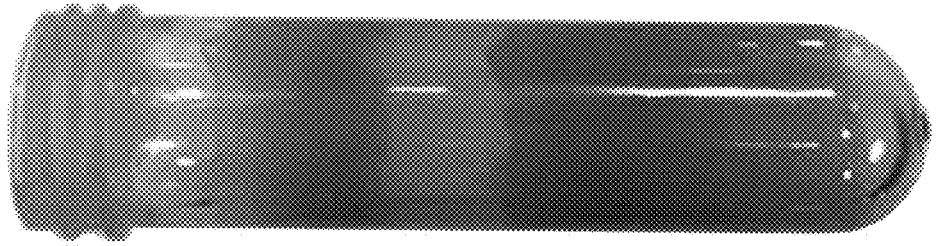

FIG. 2 is a photograph of a monolayer bottle made via the process described herein. In FIG. 2, the bottle is substantially transparent. It is filled with conditioner to more clearly show the ribbons/waves. In FIG. 2, the first regions are substantially transparent and comprise a colorless PET resin and the second regions are transparent and comprise PET resin and a dye, in this example the dye is blue. In this example, the second regions are responsible for forming a horizontal pattern of ribbons/waves, since the first regions are colorless. As seen in FIG. 2, the intensity of the blue in the second region varies across the ribbon pattern due to the manufacturing process, as described herein. In FIG. 2, the ribbons are relatively thin, however, the width of the striations can be adjusted, as seen in the preforms of FIG. 3. In some examples, at least 60% of the bottle can be transparent, alternatively at least 70%, alternatively at least 80%, alternatively at least 85%, alternatively at least 90%, and alternatively at least 95%.

FIG. 3 is a photograph of preforms made via the process described herein. This figure shows variations between the preforms that are made via the same process. Due to the manufacturing process, each preform and subsequently each bottle can have a unique pattern. This uniqueness can contribute to a premium appearance to the product and can be eye-catching at the store shelf or web browser/app.

The preforms and bottles described herein can be monolayer or multilayer. In multilayer preforms or bottles, one or more layers can be pulsed, which varies the thickness across the length of the article. For example, in FIGS. 4A-4C, described hereafter, the core is pulsed and in FIG. 5A, described hereafter, the outer layer is pulsed, and in FIG. 5B, layer 2", which can be an inner layer, is pulsed. In some examples, pulsing one or more layers can change the opacity of the bottle.

Figure 4A:
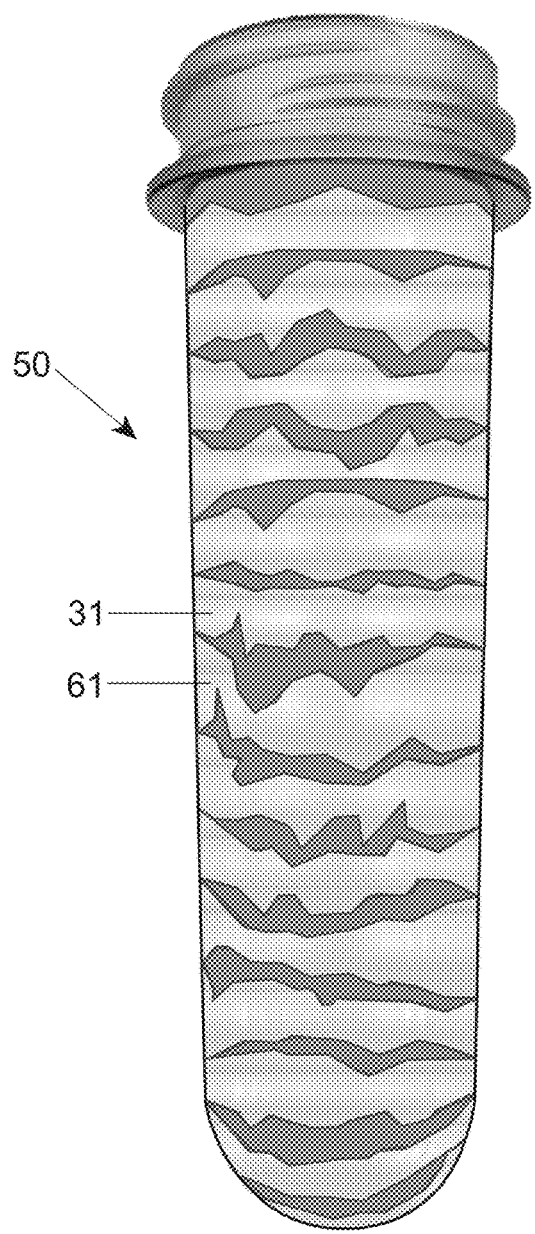
FIG. 4A represents schematically a multilayer preform.
Figure 4B:
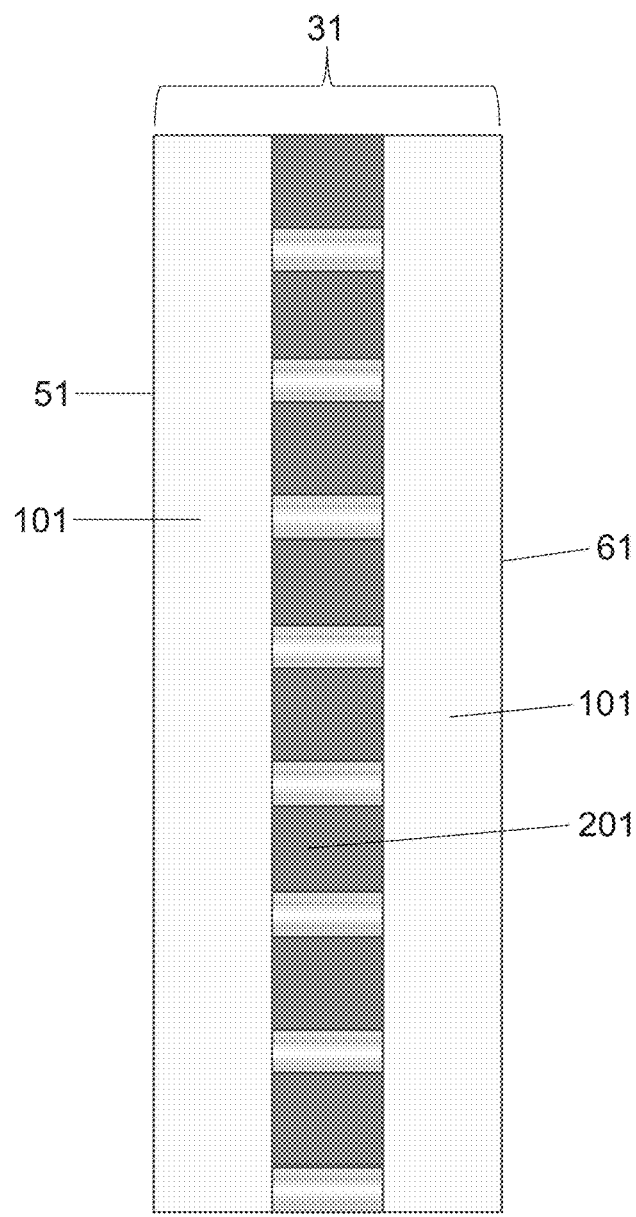
FIG. 4B represents schematically am enlarged cross-section of the wall of the multilayer preform of FIG. 4A.

FIG. 4A shows a schematic of preform 50 and FIG. 4B shows a schematic of a cross-section of the wall. The preform 50 includes a hollow body defined by wall 31 having an inner surface 51 and an outer surface 61. In this example the wall has two skin layers 101 comprising a first composition. The skin layers 101 can comprise the outer surface 61 and the inner surface 51. During manufacturing, a second composition can be pulsed between the skin layers resulting in a third layer 201 in all or some areas of the bottle. The core 201 can be between the skin layers 101. The core 201 can be pulsed (i.e. when it is formed the flow can be accelerated and decelerated and/or stopped) to create visual effects. The visual effects can be non-uniform. The preform can be stretched during blow molding to form the final article and a schematic of the final article is in FIG. 4C.

Figure 4C:
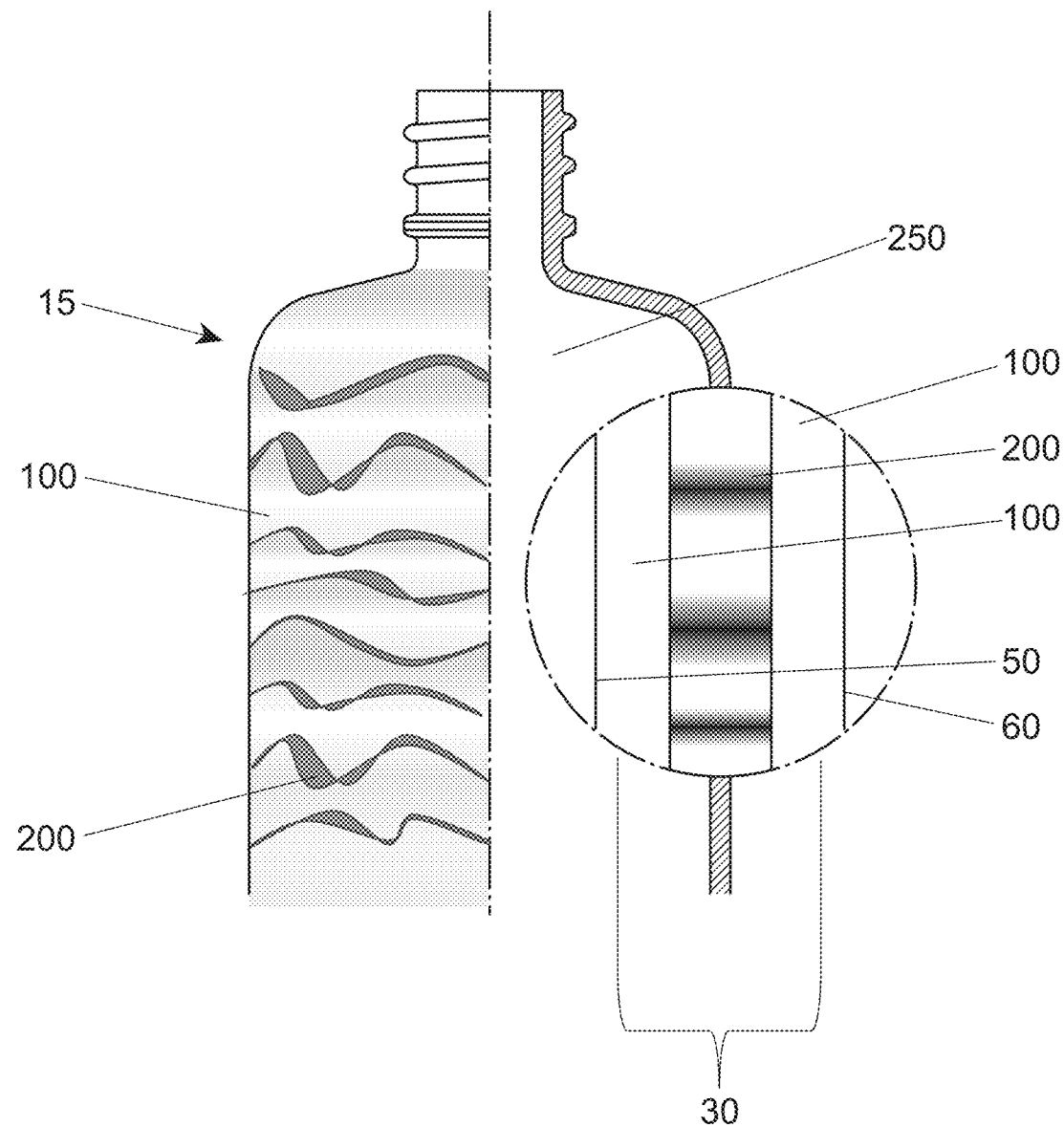
FIG. 4C represents schematically a blow molded multilayer bottle showing an enlarged schematic cross-section thereof.

FIG. 4C shows a schematic of hollow article 15, in this example the hollow article is a container, specifically a bottle. The hollow article 15 includes hollow body 250 defined by wall 30 having an inner surface 50 and an outer surface 60. As shown in the enlarged cross section, wall 30 has at least two layers 100 comprising a first composition and in distinct areas comprises an additional layer 200 comprising a second composition. In some examples, like the schematic in FIG. 4C the second composition is located between the layers of first composition across the entire body of the article. In other examples, it is possible that during blow molding the second composition is pulled and stretched so it comprises at least a portion of the outer surface and/or inner surface.

Similar to FIG. 1, in the core there can be two regions: first regions that comprise the first composition or primarily the first composition and second regions that comprise the second composition or primarily the second composition. Between the first regions and the second regions the first composition and the second composition can be interpenetrated.

In the example in FIG. 4C the Gloss 20° and surface roughness can be uniform across the body.

FIG. 5A shows a schematic of a cross-section of an enlarged portion of a preform. Wall 30' can have five layers: innermost layer 5' including inner wall 51', 4', 3', 2', and outermost layer 1'. Layer 1' is pulsed and is only present on discrete areas of the outer wall 61' of the preform. The thickness of the outermost layer 1' varies across the length of the preform and in some instances is substantially Layer 1' can form circles around the circumference of the preform. Layers 1', 3', and 5' can be opaque and layers 4' and 2' can be transparent. In some examples, layers 1', 3', and 5' can contain an effect pigment and/or dye. In some examples, layers 2' and 4' can contain a dye. I FIG. 5B shows a schematic of a cross-section of an enlarged portion of a preform. Wall 30" can have six layers: innermost layer 6" including inner wall 51"; 5", 4", 3", 2", and 1". Layers 2" and 1" can form outer wall 61". Layers 2", 4", and 6" can include pigments, such as effect pigments and optionally a dye. Layers 2", 4", and 6" can be opaque. Layers 1", 3", and 5" can be transparent and can optionally include a dye. In some examples, layers 1", 3", and 5" can contain effect pigments and layers 2", 4", and 6" can be transparent. When the preform is made the stream for 2" is pulsed, but instead of turning it on and off, like in the example in FIG. 5A, the flow rate of the stream is turned up or down. In some instances, the flow rate of the stream for making layer 2" can overtake stream 1".

In the examples in FIGS. 5A and 5B, the Gloss 20° and surface roughness of the multilayer bottle can be similar to the monolayer bottle, described herein.

In some examples, such as the bottles that can be formed by the preforms in FIGS. 5A and 5B, the body can be mostly opaque. For example, at least 60% of the body can have an opacity great than 70%, alternatively at least 70% of the body can have an opacity greater than 70%, alternatively at least 80% of the body can have an opacity greater than 70%, alternatively at least 90% of the body can have an opacity greater than 70%, and alternatively at least 95% of the body can have an opacity greater than 70%. Opacity is measured according to the Opacity Test Method, described hereafter.

The average wall thickness for monolayer and multilayer articles can be from about 200 µm to about 5 mm, alternatively from about 250 µm to about 2.5 mm, alternatively from about 300 µm to about 2 mm, alternatively from about 350 µm to about 1.5 mm, alternatively from about 375 µm to about 1.4 mm, and alternatively from about 400 µm to about 1 mm. The average panel wall thickness can be determined using the Local Wall Thickness method, described hereafter. The average local wall thickness can vary by less than 20% across the volume, alternatively less than 15%, alternatively less than 10%, and alternatively less than 10%.

The article may comprise more than 50% wt., preferably more than 70% wt., more preferably more than 80% wt, even more preferably more than 90% wt. of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP), polymethylpentene (PMP), liquid crystalline polymer (LCP), cyclic olefin copolymer (COC), and a combination thereof. Preferably, the thermoplastic resin is selected from the group consisting of PET, HDPE, LDPE, PP, PVC, PETG, PEN, PS, and a combination thereof. In one example, the thermoplastic resin can be PET.

Recycled thermoplastic materials may also be used, e.g., post-consumer recycled polyethylene terephthalate (PCR-PET); recycled polyethylene terephthalate (rPET) including post-industrial recycled PET, chemically recycled PET, and PET derived from other sources; regrind polyethylene terephthalate.

The thermoplastic materials described herein may be formed by using a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin used herein could have relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials. Therefore, in an alternative embodiment, the article is substantially free of the expensive metallocene thermoplastic materials.

The first composition and the second composition can both contain a thermoplastic resin. The thermoplastic resin in the first composition can be the same or it can be different than the thermoplastic resin in the second composition. In one example, the first composition and the second composition can both be made from PET, which can allow a better interpenetration of the layers and/or regions at the interface due to their chemical compatibility and a more robust wall. For "based on the same type of resin" it is meant that the skin layers and core layers can contain at least 50%, at least 70%, at least 90%, and/or at least 95% of the same type of resin. For "same type" of resin it is intended resin from the same chemical class i.e. PET is considered a single chemical class. For example, two different PET resins with different molecular weight are considered to be of the same type. However, one PET and one PP resin are NOT considered of the same type. Different polyesters are also not considered of the same type.

The first composition and the second composition and/or the layers in a multilayer structure may be formed by the same thermoplastic resin (e.g. PET) and may be different only for the type of colorants. Colorants can include dyes, pigments including effect pigments and/or colored pigments and any other material commonly used to color thermoplastic resins.

The first composition and the second composition can comprise similar resins such as identical grades of PET, dissimilar grades of PET, or virgin PET/recycled PET (rPET). The use of r-PET is desirable due to decreased cost and sustainability reasons. The skin and core layers can also comprise different resins which can alternate within the article such as PET/cyclic olefin copolymer, PET/PEN, or PET/LCP. The composition of the first or second stream may also include additives to assist in dispersion or processing of the materials. The resin pair is chosen to have optimal properties such as appearance, mechanical, and gas and/or vapor barrier.

The first and/or second composition can comprise effect pigments resulting in regions of the article or in some instances the entire article can appear metallic, sparkly, and/or pearlescent. It can be expensive to incorporate effect pigments and/or opacifying pigments into large scale blow molded articles because the weight percent loading of pigment particles required to achieve the desired optical and/or effect is difficult to afford within the context of high-volume disposable packaging.

The articles can comprise one or more sub-layers with various functionalities. For instance, an article may have a barrier material sub-layer or a recycled material sub-layer. The sub-layer can form the outer surface of the wall of the article, the inner surface of the wall of the article, or it can bisect the wall, forming an additional layer. Such layered containers can be made from multiple layer preforms according to common technologies used in the thermoplastic manufacturing field.

The article can contain, in any of its layers as long as the required properties of the layer are maintained, additives typically in an amount of from about 0.0001% to about 9%, from about 0.001% to about 5%, and/or from about 0.01% to about 1%, by weight of the article. Non-limiting examples of the additives can include filler, cure agent, anti-statics, lubricant, UV stabilizer, anti-oxidant, anti-block agent, catalyst stabilizer, nucleating agent, and a combination thereof.

The first composition and/or the second composition can contain opacifying pigments. Opacifying pigments can include opacifiers, opaque absorption pigments, and combinations thereof.

Non-limiting examples of opacifiers can include titanium dioxide, calcium carbonate, silica, mica, clays, minerals and combinations thereof. Opacifiers can be any domain/particle with suitably different refractive index from the Thermoplastic Materials (e.g. PET, which can include poly(methyl methacrylate), silicone, liquid crystalline polymer (LCP), polymethylpentene (PMP), air, gases, etc.). Additionally, opacifiers can have the appearance of being white due to scattering of light or black due to absorption of light as well as shades in between as long as they block the majority of light from being transmitted to the layer underneath. Non-limiting examples of black opacifying pigments include carbon black and organic black pigments such as Paliogen® Black L 0086 (BASF).

Opaque absorption pigments can include particles that provide color and opacity to the material in which they are present. Opaque absorption pigments can be inorgainic or organic particulate materials. All absorption pigments can be opaque if their average particle size is sufficiently large, typically larger than 100 nm, alternatively larger than 500 nm, alternatively larger than 1 micrometer, and alternatively larger than 5 micrometers. Absorption pigments can be organic pigments and/or inorganic pigments. Non-limiting examples of organic absorption pigments can include azo and diazo pigments such as azo and diazo lake, Hansa, benzimidazolones, diarylides, pyrazolones, yellows and reds; polycyclic pigments such as phthalocyanines, quinacridones, perylenes, perinones, dioxazines,anthraquinones, isoindolins, thioindigo, diaryl or quinophthalone pigment, Aniline Black, and combinations thereof. Non-limiting examples of inorganic pigments can include titanium yellow, iron oxide, ultramarine blue, cobalt blue, chromic oxide green, Lead Yellow, cadmium yellow and cadmium red, carbon black pigments, and combinations thereof. The organic and inorganic pigments can be used singly or in combination.

Furthermore, the multilayer articles described herein can be less susceptible to delamination as compared to other articles. Delamination is a constant problem in manufacturing blow molded multilayer hollow articles, such as bottles and containers. Delamination can occur immediately or over time due to the mechanical handling of the container, to thermal stress or mechanical stress. It manifests typically as bubbles (which is actually the separation of the two layers at the interface which can see by a bubble-like appearance) on the container surface but can also be at the origin of container failure. Without being bound by theory, we believe that the parallel flow co-injection, due to a prolonged contact of the materials of the various layers still in molten or partially molten state, leads to the formation of an interface region between the layers wherein the layers are slightly interpenetrated. The interface region generates a good adhesion between the layers and thus makes it much more difficult to separate them.

The presence and thickness of the interfaces between the skin layers and the core (also referred to as the tie layer) and/or the presence of interpenetration between the first regions and the second regions (in monolayer or multilayer articles) could be determined by the Tie Layer Thickness Method, described hereafter. The thickness of the interface is the distance normal to the interface over which the composition of the unique pigment, additive or resin is changing between the maximum concentration and minimum concentration.

The thickness of the interfaces (i.e. the tie layer or transition layer or area of interpenetration) can be from about 500 nm to about 125 µm, alternatively 1 µm to about 100 µm, alternatively from about 3 µm to about 75 µm, alternatively from about 6 µm to about 60 µm, alternatively from about 10 µm to about 50 µm, as determined by the Tie Layer Thickness Method, described hereafter.

The wall of the multilayer article can be formed without adhesives (or substantially free of adhesives) by ISBM.

It has also been found that multilayer articles according to the invention have an improved resistance to delamination not only with respect to articles obtained by blow molding of preforms made using step flow co-injection or overmolding, but even with respect to articles obtained from monolayer preforms. In other words, the interface layer appears to further strengthen the article wall with respect to a monolayer execution. Delamination resistance is evaluated measuring the Critical Normal Load, as described hereafter. A higher Critical Normal Load indicates a higher delamination resistance.

The articles, in particular the multilayer articles, can have a critical normal load of greater than or equal to 50N, greater than or equal to 60N, greater than or equal to 70N, greater than or equal to 80 N, greater than or equal to 90 N, greater than or equal to 95 N, greater than or equal to 100 N, greater than or equal to 104 N, greater than or equal to 105 N, greater than or equal to 110 N, and/or greater than or equal to 120 N. The articles can have a critical normal load of from about 50 N to about 170 N, alternatively from about 80 N to about 160 N, alternatively from about 90 N to about 155 N, and alternatively from about 100 N to about 145 N. The critical normal load can be measured by the Critical Normal Load, using the method described hereafter.

Another aspect the present invention relates to a hollow preform which can be blow molded to make an article as described above. The preform can be made by parallel coinjection of two or more streams and wherein one or more streams make up the first composition and the remaining streams make up the second composition and subsequent compositions.

As apparent to a skilled person, such a preform once blow molded will form an article having first compositions and second composition, wherein the regions of the preform will form the corresponding regions of the article.

Monolayer articles could be made as follows. A system for injection molding of monolayer preforms could be setup in a typical industrial fashion with alterations to the usual single stream feed system. A second molten stream could be introduced into a modified existing nozzle system. This nozzle system could continue to have the capability of control positioning of the pin. This control positioning could be capable of altering the flow of both streams by both screw and or nozzle pin position control. The pin position could allow more or less material from either stream to flow through the nozzle. With this capability, one could adjust material properties of one of the streams to have a difference in flow properties which could encourage flow instabilities.

Another method to create the flow instabilities in the same system as described above could be to adjust processing conditions which could impact stream flows. Injecting one of the materials at different temperatures, pressures, or fill times could generate the instabilities required to obtain the visual appearance. Using a similar system as above, one skilled in the art could change the geometry on the side wall of the nozzle, cavity, or modify the shape of the pin which could create a disruptive flow through the nozzle. Essentially, the bulk flow of one stream could dominate the overall flow through the nozzle while alterations to the nozzle, cavity wall or pin geometry could encourage leakage of the secondary stream which could generate a feed stream into the bulk stream yielding a visual effect.

Multilayer articles could be made as follows. A system of co-injection molding used for multilayer structures could be set up in a similar fashion as used in the industry today. In a typical co-injection system two materials could be introduced into a nozzle to create layers of material which when properly executed create articles when are typically used in the beverage industry. In this method, it was found that creating instabilities in flow of one of the two materials create a visual appearance in the final article which was appealing to the consumer. To create the instabilities, multiple modifications could be made to the material properties or the processing parameters. Material modifications including molecular weight, melt flow index, and or intrinsic viscosity, which will yield flow properties which are uniquely different from the other stream. These flow differences create flow instabilities as the material is introduced into the nozzle cavity. As mentioned above, modifications to the internal geometry of the nozzle, the cavity wall, or pin geometry could also generate flow instabilities.

Another method to generate a visual effect using the above described approach could be to modify the processing conditions which could affect the flow properties of one of the streams. Temperatures, pressures, and fill times could also have an impact on the flow materials. One skilled in the art could modify the material properties or processing conditions which could allow one material to flow differently in the nozzle cavity. Once skilled in the art could also modify the pin positions to allow for one material to have different volumetric flows. These different volumetric flows could range from a very small amount leaking into the other stream. This approach could yield an article which could have areas of higher concentration than the other stream producing an effect which may resemble ribbons, waves, marble, or striations. Another method to create the flow instabilities as indicated above, could be to actuate the pin continually moving it from open to close position in the nozzle. This could essentially affect pressure in the system creating pressure and volumetric pulses which could translate to flow perturbations. These perturbations will create flow irregularities or instabilities which will result in our desired visual appearance.

To create a pattern that could include ribbons, waves, and/or striations in the preform and subsequently the blow molded article during the injection molding the flow rate of the first and/or second composition could be stopped (partially or completely) or stuttered. When the system is feeding molten material into the nozzle configuration there could be a resistance to flow that causes a positive pressure in the system. If screw speed, ram speed, or nozzle position are altered it could cause a fluctuation in flow, resulting in visual effects. In one example, the pulsing can be done with a pressure change during the injection molding shot and process.

This change in stream flow rates and/or pressure changes, results in ribbons, waves, or striations that appear as a pattern that is predominantly horizontal to the longitudinal axis of the preform. On the final article, the nonuniform pattern can be most visible when there is a high level of contrast between the first composition and the second composition.

One such way of achieving this pressure difference could be a very rapid forward movement and stoppage of the pulsed material injection screw enabling the main material to overcome the pressure and "fill" the preform completely with the first composition, free of or substantially free of the second composition. When the pulsed injection screw continues again the multilayer structure (e.g. a trilayer structure) can be recreated until the screw were stopped again. Depending on how many ribbons, waves, or striations are desired this process can be repeated as the preform is being created. Opening and then completely closing the screw in rapid succession can result in a plurality of thin ribbons. Opening and then completely closing the screw in a slower succession can result in a few or several thicker ribbons. In other examples, the screw can be slowly opened and/or slowly closed resulting in a color gradient. In other examples, a combination of opening and closing patterns can be done to create a combination of patterns. It can be difficult to control this to tight manufacturing tolerances, which can result in each preform and subsequent articles that have a unique appearance.

The process for monolayer and/or multilayer could be adjusted to control the screw feed rates from 0-100%. In one example, the screw feed rate for the second material is always greater than 0%. In some examples the screw feed rate is slowly adjusted from 0% to 100% to create a wider area with a sharp gradient and in other examples the screw feed rate is quickly adjusted from 0% to 100% to create narrow bands.

In some examples, only the screw feed rate for the second composition could be adjusted and in other examples the screw feed rate for the first composition is adjusted based depends on how much pigment and/or pattern is desired on the final article. It is also possible to add additional compositions to create more complex patterns and/or more colorful bottles.

Another method of for creating the monolayer or multilayer preform could be to combine stuttering the second composition and couple it with pin positioning in the nozzle. This method would utilize coordinated timing between the second composition stopping and valve nozzle stem moving forward to seal off the channels that inject the secondary material in the nozzle thereby fully stopping the flow of the pulsed material and can also prevent the main material from entering the pulsed material channel. This could create greater definition to the banding rather than a soft line where the pulsed material slowly tapers at the start/stop locations.

Most typically the second composition would be pulsed (e.g. turned on/off) due to machine configurations and setup. However, the first composition or both compositions could be pulsed and, in some instances, can provide a similar look/feel.

Varying the temperature of the at least two resins can cause flow instabilities when forming the preform, which can result in irregular visual effects on the bottle because temperature can impact the viscosity of the thermoplastic material. In one example, when forming a multilayer preform the material for the core layer (stream I) can be injected at a lower temperature than the material for the skin layers (stream II). In another example, the compositions can all contain the same thermoplastic plastic material and be approximately the same temperature.

Another process parameter that could be controlled during the co-injection of the preforms is pressure of the streams of resin measure along the manifold line supplying the injection nozzle. The stream (or streams) containing the material for the skin layers (stream II) can be kept in a range between about 25 bar and about 400 bar, and alternatively between about 150 and about 400 bar, while the lower temperature/higher viscosity stream of core layer (stream I) can be kept in a range between about 1000 and about 1600 bars, alternatively between about 1000 and 1400 bars.

TEST METHODS

When the article is a container or a bottle, the critical normal load, gloss 20°, and surface roughness measurements were all performed on a sample panel that was removed from the article. Samples with dimensions of 100 mm in length and about 50 mm in width are cut out from the main portion of the article wall and at last 50 mm away from shoulder/neck and base regions.

When the article does not allow taking a sample this large, shorter samples in scale 1:2 width: length may be used as detailed further below. For containers and bottles, the sample is preferably removed from the label panel of the bottle at least 50 mm away from shoulder/neck or base regions. The cutting is done with a suitable razor blade or utility knife such that a larger region is removed, then cut further down to suitable size with a new single edge razor blade.

The samples should be flat if possible or made flat by using a frame maintaining the sample flat at least in the region where the test is done. It is important that the sample is flat to determine the Critical Normal Load, the gloss 20°, and surface roughness.

Critical Normal Load (N) and Scratch Depth at Region of Failure

If the sample readily delaminates upon removal from the bottle, the sample is given a score of 0 N for the "Critical Normal Load." For samples which remain intact, they are subjected to scratch-induced damage using a Scratch 5 from Surface Machine Systems, LLC according to Scratch Test Procedures (ASTM D7027-13/ISO 19252:08) using a 1 mm diameter spherical tip, Initial Load: 1 N, End Load: 125 N, Scratch Rate: 10 mm/s, and Scratch Length of 100 mm For samples smaller than 100 mm, the Scratch Length can be decreased while keeping the initial and end loads the same. This provides an estimate of the Critical Normal Load. Using this estimate, additional samples can be run over a narrower load range to provide more accurate determination of the Critical Normal Load.

Scratch-induced damage is performed on both sides of the sample corresponding to the inner and outer surface of the bottle. It is critical that the sample is affixed to the sample stage by the use of foam-based double-sided tape such as Scotch® Permanent Mounting Tape by 3M (polyurethane double-sided high-density foam tape with acrylic adhesive having a total thickness of about 62 mils or 1.6 mm, UPC #021200013393) on the underside of the sample. All samples are cleaned with compressed air before the scratch test.

The Point of Failure is visually determined after completing the scratch test as the distance across the length of the scratch at which the onset of visible delamination occurs. Delamination introduces an air gap between layers which is visible to the naked eye or with assistance of a stereomicroscope by one skilled in the art. as. This is validated based on a minimum three scratches per each side of the sample (defined as the cut out from bottle above) with a standard deviation of 10% or less. The side with lower Critical Normal Load is reported as the result of this method. The Scratch Depth at Region of Failure is measured according to ASTM D7027 across the scratch location at the point which the onset of delamination occurs. The Critical Normal Load (N) is defined as the normal load recorded at the location determined to be the Point of Failure. A Laser Scanning Confocal Microscope (KEYENCE VK-9700K) and VK-X200 Analyzer Software is used to analyze scratch-induced damage including the Point of Failure, Scratch Width, and Scratch Depth.

Gloss 20° Method

Gloss 20° is measured with a gloss meter at 20° micro-TRI-gloss (BYK-Gardner GmbH) according to ASTM D 2457/D523. Each point is measured three times and the mean is calculated to determine the gloss 20°. All gloss measurements were done over black background which we refer to as "Base Black." Base Black is the black area from the X-Rite Grey Scale Balance Card (45as45 L*a*b* 21.077 0.15 −0.29). The measurements provided by the Micro-Tri Gloss meter have the unit "GU" which stands for "gloss units."

Local Wall Thickness

Wall thickness at specific locations was measured using an Olympus Magna-Mike® 8600 using a ⅛" dia. target ball. Three measurements were taken at each location and the mean was calculated to determine the local wall thickness.

The average local wall thickness was determined by determining the local wall thickness as described above across the length of the article or panel and then calculating the mean. The thickness near the shoulder and near the base is excluded from the average local wall thickness.

Surface Roughness Measurement Method

A sample panel is analyzed for Ra (arithmetical mean height) using a portable surface roughness tester such as the Surftest SJ-210 (Mitutoyo America Corporation) was placed at an even height of the bottle. The roughness is measured in units of μm.

Tie Layer Thickness (Interface Layer Thickness):

A unique additive, colorant, or resin is placed within at least one of the layers which allows either Method A or Method B to map the composition over the distance normal to the interface over which the composition of the unique additive, colorant, or resin is changing between the maximum concentration and minimum concentration.

Method A: Energy Dispersive X-ray Spectroscopy (EDS) Mapping Method for adjacent layers having unique elemental composition by virtue of the resins (e.g. PET/Nylon) or colorants/additives.

Method A may be used if the bottle sample (preparation of the bottle sample is described below) will contain colorants and/or additives at or above 2 wt. % having elemental compositions which may be suitably mapped by EDS (e.g. elements higher than atomic number 3 not including carbon or oxygen). These colorants/additives can be molecular species or particulates. If they are particulate in form, they should be well dispersed such that there are about 10 or more particles within a 5 μm×5 μm×200 nm volume. Generally, the particles should be less than 500 nm in the largest dimension.

Sample Preparation:

A piece of the bottle label panel wall at least 50 mm away from shoulder/neck or base regions measuring ~3 cm×3 cm is extracted using a heated blade. The heated blade enables sectioning of the bottle without applying large amounts of force which may induce premature delamination. This accomplished by melting the panel wall material rather than cutting. The melted edges of the piece are removed with scissors, then the ~3 cm×3 cm piece is further sectioned into several pieces measuring approximately 1 cm×0.5 cm, using a new sharp single edge razor blade. The cutting force is applied along the length of the piece, parallel to the layers/interfaces, rather than perpendicular to the interface to prevent smearing across the interface.

Then, the ~1 cm×0.5 cm pieces are then hand polished, edge-on, producing a polished surface which displayed the cross-section of the bottle wall and the layered structure. The initial polishing consists of using SiC papers, with progressively smaller grit sizes (400, 600, 800, and then 1200) while using distilled water as a lubricant/coolant. The 1200 grit polished surface is then further polished, using 0.3 μm $Al_2O_3$ polishing media, with distilled water being used as lubricant. The polished samples are then ultrasonically cleaned in a solution of detergent+distilled water, for 1 min, followed by three additional rounds of ultrasonic cleaning in fresh distilled water, to rinse the detergent from the sample. A final ultrasonic cleaning is performed in ethanol for 2 min. The polished and cleaned samples are mounted on a SEM stub with double sided carbon tape with the edge-on side up, then coated with approximately 1020 nm of carbon, as deposited by carbon evaporator such as a Leica EM ACE600 (Leica Microsystems).

Identification of the Approximate Interface by SEM:

Identification of the approximate interface between A/C or C/B layers is necessary in order to allow finding the interface in the dual-beam FIB. To identify the approximate interface, SEM imaging and EDS mapping is performed by a modern field emission SEM such as a FEI (Thermo Scientific®) Apreo SEM equipped with a silicon drift EDS detector (SDD) such as an EDAX Octane Elect 30 mm$^2$ SDD (EDAX Inc.). A preliminary EDS map at about 500 to 1000× magnification is collected across the cross-sectional plane to confirm the presence of the layered structure by identifying the unique elements present in each layer. The accelerating voltage is suitably set in order to ionize the most ideal electron shell of the elements of interest in order to generate an X-ray signal. USP<1181> (USP29–NF24) provides a useful reference for choosing the best operating conditions to collect the EDS signal.

The EDS map is used to show the approximate location of the interface between the layers, after which platinum fiducial markers are deposited via e-beam deposition, using a gas injection system (GIS), to mark the location of the interface. Another, EDS map is collected, with the Pt fiducial markers, to confirm their location with respect to the interface.

Dual-Beam FIB Sample Preparation:

A thin foil sample (100-200 nm thick) is required to map the interface at suitably high resolution. The lamella is prepared using a modern dual beam FIB such as an FEI (Thermo Scientifc®) Helios 600. The interface is located in the FIB with the aid of the platinum fiducial markings. A protective platinum cap is then deposited on the area of interest at the interface in the FIB, measuring approximately 30 μm×2 μm×2 μm. This is done to protect the material, which will become the lamella sample, from unnecessary damage from the ion beam. The 30 μm dimension is oriented perpendicular to the interface such that approximately 15 μm covers one side of the interface and 15 μm covers the other side. Material is then removed from each side of the platinum cap, leaving the capped region as a lamella, measuring approximately 30 μm wide×2 μm thick×10 μm deep where the interface is oriented parallel to the 10 μm direction. The lamella is then extracted, with the aid of an Omniprobe nanomanipulation device (Oxford Instruments), and attached to a copper Omniprobe grid. The lamellar sample is then thinned, using 30 kV gallium ions, until sufficiently thin (~500-200 nm). The newly-thinned lamellar sample is then cleaned with 5 kV gallium ions, to remove excess damage caused by the 30 kV thinning process.

STEM Data Collection:

Scanning transmission electron microscopy (STEM) Energy Dispersive X-ray Spectroscopy (EDS) data is collected using a modern field emission TEM such as a FEI Tecnai TF-20 (Thermo Scientific®) equipped with a modern silicon drift EDS detector (SDD) such as an EDAX Apollo XLT2 30 mm$^2$ SDD detector (EDAX Inc.) with collection and analysis software such as Apex™ (EDAX Inc.). The interface region from within the foil produced as described above is mapped with EDS to display the presence and location of the elemental constituents in the two polymer layers. The size of the EDS map is about 20×10 μm where the interface is perpendicular to the 20 μm direction ("Y" direction) and parallel to the 10 μm direction ("X" direction). The "Y" and "X" directions are perpendicular or almost perpendicular to each other.

The map is collected by using between 200 to 300 kV accelerating voltage and a beam current at or between 100 pA and 1 nA to achieve SDD count rate of at least 3,000 counts per second. The map resolution is at least 256×160 pixels with a dwell time of about 200 μs per pixel. About 200 frames are collected for a total map time of about 30 minutes. The elements of interest are selected and a standardless automatic ZAF analysis method such as the P/B-ZAF fundamental parameter analysis is selected to enable quantitative mapping.

Data Processing:

The EDS map data can be displayed as color-coded images, with a unique color corresponding to each element. The intensity of the color is scaled with the concentration of the elemental species. The EDS map data is processed to display a line profile of normalized atom % by summing the X-ray counts for each element as they occur in the "Y" direction (parallel to the interface) and the summed intensities are plotted as a function of distance across the interface in the "X" direction (normal to the interface). The distance between the maximum and minimum normalized atom % (both having about zero slope across about 2-4 microns) for at least one element is defined as the interface layer thickness.

Method B: Confocal Raman Spectroscopy Mapping Method for adjacent layers having unique spectral characteristics by virtue of the resins (e.g. PET/COC) or colorants/additives.

2D Chemical maps or line scans are collected across the layer interface using a confocal Raman microscope (Witec A300R Confocal Raman spectrometer) equipped with a continuous laser beam, motorized x-y sample scanning stage, video CCD camera, LED white-light source, diode-pumped laser excitations from 488 nm to 785 nm, and 50× to 100× (Zeiss EC Epiplan-Neofluar, NA=0.8 or better) microscope objectives.

Samples are prepared in a similar manner as described in Method A—Sample Preparation section, however the samples are uncoated.

The sample is mounted on a glass microscope slide with edge-on side up. An area of interest near the layer interface is located with the aid of the video CCD camera using the white-light source. From the area of interest, 2D Chemical maps via spectral acquisition are acquired by focusing the laser beam at or below the surface and scanning across the layer interface in the X-Y direction with steps of 1 μm or lower, with integration time lower than 1 s at each step. The integration time should be adjusted to prevent saturation of the detector. Raman images are generated using a suitable software such as the WItec™ Project Five (Version 5.0) software using spectral features unique to each polymer layer such as peak intensities, integrated areas, peak widths, and/or fluorescence. The full Raman spectral data at each pixel in the data set is corrected for cosmic rays and baseline corrected prior to image generation. To determine intermixing between polymer layers, a cross section analysis wherein the spectral features used to generate the chemical map are followed along a line drawn across the interface including at least 10 microns within area that covers the polymer layers of interest. The defined spectral features are plotted against distance in micrometers. The interlayer mixing distance (i.e.

tie layer) is defined as the distance between the maximum and minimum values of the spectral features.

Opacity Test Method

Opacity is measured on cut out portions of the bottle with a portable densitometer such as the X-rite 341C (X-Rite, Inc.) with 3 mm diameter aperture. The absolute optical density (D) is measured and then converted to Transmission (T) by $D=-\log_{10} T$ where % Opacity is 100-% T. Optical density (D) of 5.00=100% Opaque and 0.00=0% Opacity. Each point is measured three times and the mean is calculated to determine the % Opacity.

ADDITIONAL EXAMPLES

A. A blow molded monolayer article comprising:
 a. a hollow body defined by a wall comprising an inner surface and an outer surface, the wall being formed by one layer comprising:
  i. one or more first regions comprising a first composition wherein the first region extends from the inner surface to the outer surface;
  ii. one or more second regions comprising a second composition wherein the second region extends from the inner surface to the outer surface and wherein the second region comprises an axial color gradient;
 wherein the one or more first regions and the one or more second regions form an irregular pattern on the surface of the article.
B. The blow molded article according to paragraph A, wherein the wall comprises a plurality of first regions and a plurality of second regions.
C. The blow molded article according to paragraph B, wherein the first regions and the second regions are interpenetrated.
D. The blow molded article according to paragraph A, wherein the first composition and the second composition comprise polyethylene terephthalate.
E. The blow molded article according to paragraph D, wherein the first composition and the second composition are different colors.
F. The blow molded article according to paragraph E, wherein the second composition comprises an effect pigment.
G. The blow molded article according to paragraph F, wherein the first composition is substantially free of effect pigment.
H. The blow molded article according to paragraph F, wherein a location of the one or more second regions comprises a surface roughness of greater than 25 μin.
I. The blow molded article according to paragraph A, wherein a location of the one or more first region comprises a surface roughness of less than 8 μin.
J. The blow molded article according to paragraph A, wherein at least a portion of the article is transparent.
K. The blow molded article according to paragraph A, wherein at least a portion of the article is opaque.
L. The blow molded monolayer article according to paragraph A, wherein the article is a bottle.
M. The blow molded monolayer article according to paragraph A, wherein the article had a Critical Normal Load greater than 50 N.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded monolayer article comprising:
 a. a hollow body defined by a wall comprising an inner surface and an outer surface, the wall being formed by one layer comprising:
  i. one or more first regions comprising a first composition wherein the first region extends from the inner surface to the outer surface;
  ii. one or more second regions comprising a second composition wherein the second region extends from the inner surface to the outer surface and wherein the second region comprises an axial color gradient;
   wherein the one or more first regions and the one or more second regions form an irregular pattern on the surface of the article.

2. The blow molded article of claim 1 wherein the wall comprises a plurality of first regions and a plurality of second regions.

3. The blow molded article of claim 2 wherein the first regions and the second regions are interpenetrated.

4. The blow molded article of claim 1 wherein the first composition and the second composition comprise polyethylene terephthalate.

5. The blow molded article of claim 4 wherein the first composition and the second composition are different colors.

6. The blow molded article of claim 5 wherein the second composition comprises an effect pigment.

7. The blow molded article of claim 6 wherein the first composition is substantially free of effect pigment.

8. The blow molded article of claim 6 wherein a location of the one or more second regions comprises a surface roughness of greater than 25 μm.

9. The blow molded article of claim 1 wherein a location of the one or more first region comprises a surface roughness of less than 8 μm.

10. The blow molded article of claim 1 wherein at least a portion of the article is transparent.

11. The blow molded article of claim 1 wherein at least a portion of the article is opaque.

12. The blow molded monolayer article of claim 1, wherein the article is a bottle.

13. The blow molded monolayer article of claim 1, wherein the article had a Critical Normal Load greater than 50 N.

14. A blow molded multilayer article comprising:
 a. a hollow body defined by a wall comprising an inner surface and an outer surface, the wall being formed by
  i. a first skin layer comprising a first composition and an outer surface of the wall;

ii. a second skin layer comprising the first composition and an inner surface of the wall;
iii. a core layer comprising a second composition;
wherein the core layer, the first skin layer, or the second skin layer comprises a thickness that varies across the length of the article to form an irregular pattern that can be viewed on the surface of the article.

15. The blow molded multilayer article of claim 14 wherein the thickness of the second skin layer is varied.

16. The blow molded multilayer article of claim 15 wherein the thickness of the second skin layer decreases to substantially zero at least once across the body.

17. The blow molded multilayer article of claim 15 wherein the thickness of the second skin layer decreases but does not decrease to substantially zero at any point across the body.

18. The blow molded multilayer article of claim 15 wherein the average local wall thickness varies by less than 20% across the volume.

19. The blow molded multilayer article of claim 14 wherein at least 70% of the body comprises an opacity greater than 70%.

20. The blow molded multilayer article of claim 14 wherein the first composition and the second composition comprise polyethylene terephthalate and wherein the core layer further comprises an effect pigment.

* * * * *